United States Patent

[11] 3,568,698

| [72] | Inventor | William R. Bodwell<br>Norfolk, Va. |
|---|---|---|
| [21] | Appl. No. | 600,620 |
| [22] | Filed | Dec. 9, 1966 |
| [45] | Patented | Mar. 9, 1971 |
| [73] | Assignee | Newport News Shipbuilding and Dry Dock Company<br>Newport News, Va. |

[54] LIQUID LEVEL CONTROL SYSTEM EMPLOYING FLUIDIC DEVICES
11 Claims, 4 Drawing Figs.

| [52] | U.S. Cl. | 137/81.5 |
|---|---|---|
| [51] | Int. Cl. | F15c 1/12 |
| [50] | Field of Search | 137/81.5 |

[56] References Cited
UNITED STATES PATENTS

| 3,467,122 | 9/1969 | Jones | 137/81.5 |
|---|---|---|---|
| 3,171,421 | 3/1965 | Joesting | 137/81.5 |
| 3,228,410 | 1/1966 | Warren et al. | 137/81.5 |
| 3,273,377 | 9/1966 | Testerman et al. | 137/81.5X |
| 3,277,914 | 10/1966 | Manion | 137/81.5 |
| 3,331,380 | 7/1967 | Schonfeld et al. | 137/81.5 |
| 3,378,022 | 4/1968 | Sorenson | 137/81.5 |

*Primary Examiner*—Samuel Scott
*Attorney*—Shoemaker & Mattare

ABSTRACT: A control system is provided for maintaining the liquid level in a container within an upper and a lower limit. Upper and lower sensing devices are connected in the system for controlling the pressure applied to certain fluidic devices in the system. In the first modification, a pair of proportional amplifier fluidic devices are provided, one of the sensing means being operatively connected with each of these devices. The outputs of the two fluidic devices are connected with a bistable fluidic device, the output of which is connected with a liquid level control mechanism such as a pump or valve for adjusting the liquid level in the tank. In a second modification, a proportional amplifier fluidic device is provided which is connected with both of said sensing means. The output of this fluidic device is in turn connected with a bistable fluidic device the output of which is connected with a suitable liquid level control mechanism.

PATENTED MAR 9 1971 3,568,698

INVENTOR
William R. Bodwell

BY Shoemaker and Mattare
ATTORNEYS

INVENTOR
William R. Bodwell

BY Shoemaker and Mattare
ATTORNEYS

LIQUID LEVEL CONTROL SYSTEM EMPLOYING FLUIDIC DEVICES

The present invention relates to a liquid level control system employing fluidic devices, and more particularly to apparatus adapted to control the liquid level in a tank or the like within certain predetermined upper and lower level limits.

Where it is desired to maintain a relatively constant liquid level in a suitable container, the upper and lower limits of the liquid level may be set so they are close to one another, whereas in other applications, the liquid levels may be spaced apart a considerable distance. Upper and lower sensing means are provided which sense the pressure thereon and which are connected in the control system so as to control the pressure on certain fluidic devices thereof so as to thereby control the overall operation of the apparatus. The fluidic devices are operated by a source of fluid such as air under pressure, and this source of pressure may be employed for driving the motor of a pump or the like for adjusting the liquid level, or this source of pressure may be employed for operating a switch to control a pump or valve as the case may be.

The invention includes two different modifications each of which includes a proportional amplifier fluidic device connected with the sensing means, the output of this fluidic device being connected with a bistable fluidic device for controlling the bistable fluidic device the output of which in turn is connected with suitable liquid level control mechanism for adjusting the liquid level. The control system is so designed that when the upper sensing means is covered by liquid the liquid level control mechanism will be actuated so as to lower the liquid level in the tank, whereas when the lower sensing means is uncovered, the liquid level control mechanism will be actuated so as to cause the liquid level to again rise until the upper sensing means is covered once again, whereupon the cycle continues to automatically repeat for maintaining the liquid level between an upper and a lower limit. Suitable manually controlled valve means is inserted in the control system for controlling pressures on various components thereof so as to thereby permit the control of the point of operation of the various fluidic devices to thereby adjust the exact level of the liquid in the associated tank which will cause operation of the components of the control system.

The control system of the present invention affords many advantages as compared with prior art systems. When employing fluidic devices of the type utilized in this system no moving parts are required thereby substantially reducing the amount of maintenance required and eliminating the necessity of lubrication or the like to parts of the system. The control system need not be located near the controlled liquid, with the exception of the two sensing means, and the system operates at a very low operating pressure on the order of 3 p.s.i. If a steam or air-driven motor is used for running a pump and the like to control the liquid level, no electrical interface is required anywhere in the entire system. The liquid container may be of any shape with the arrangement of the present invention. The control liquid may be of any type and may have an explosive or acidic nature. The sensing tubes may be varied in shape and size as well as material for different applications and are readily installed. The operating points of the system may be adjustable either by moving the sensing means or by controlling the valves of the system. The system also provides high sensitivity and excellent repeatability.

An object of the present invention is to provide a new and novel liquid level control system which is substantially automatic in operation for maintaining a liquid level between predetermined upper and lower limits, the system being quite simple and inexpensive as well as compact in construction, and yet at the same time being quite efficient and reliable in use.

Other objects and many attendant advantages of the invention will become more apparent when considered in connection with the specification and accompanying drawings, wherein.

Figure 1:
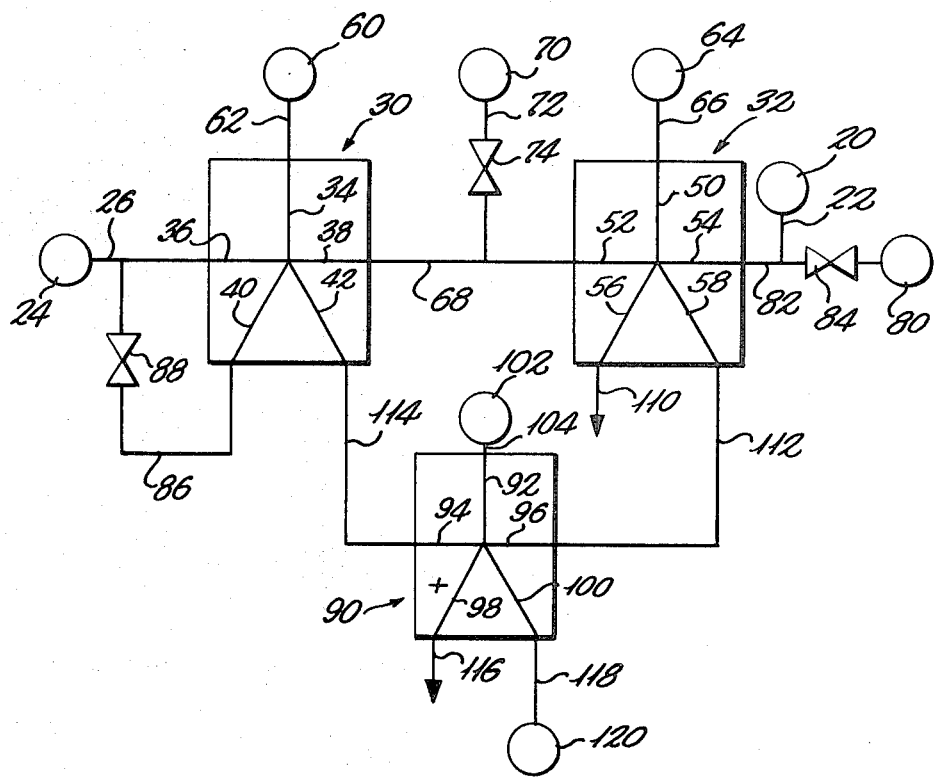
FIG. 1 is a schematic diagram of a control system according to the present invention.
Figure 2:
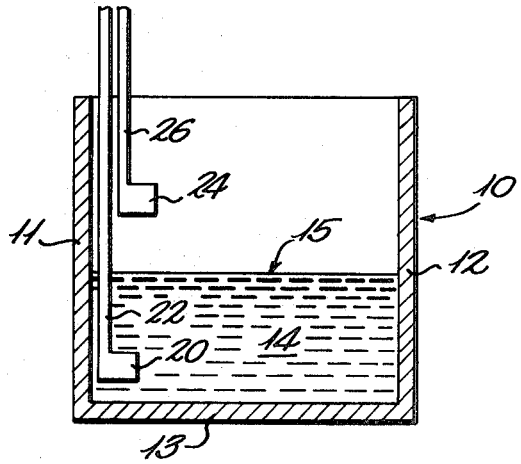
FIG. 2 is a cross section through a container having liquid therein and showing the sensing means mounted in position therewithin.

Referring now to the drawings wherein like reference characters designate corresponding parts throughout the several views, a first form of the invention is illustrated in FIGS. 1 and 2. As seen in FIG. 2, a suitable container or tank 10 includes sidewalls 11 and 12 and a bottom 13, the tank being open at the top thereof. A suitable means (not shown) is provided for draining liquid from the tank and for filling the tank. In the present invention, it is assumed that a suitable means is provided for continuously or periodically introducing liquid into the tank which tends to raise the liquid level in the tank. The liquid level control mechanism of the invention may be in the form of a pump or the like which when actuated is adapted to remove liquid from the tank so as to lower the level of the liquid in the tank. In It is apparent that other means such as a drain valve or the like may also be employed as the liquid level control mechanism is lowering the level of the liquid. It is also apparent that the control system of the present invention could also be operated so that the liquid level control mechanism would be employed to raise the level of the liquid in the tank while other means could be provided which continuously or periodically lowered the level of the liquid in the tank.

A body of liquid 14 is disposed within the tank, the upper level of the body of liquid being indicated by reference numeral 15. A first sensing means 20 is supported in the lower portion of the tank and is connected with a conduit means 22 which in turn is connected in the remainder of the control ls system as hereinafter described. A second sensing means 24 is supported at an upper portion of the tank and and is connected with a conduit means 26 which is also connected in the remainder of the control system as hereinafter described.

The lower sensing means 20 and the upper sensing means 24 may be spaced apart any suitable distance, and the liquid level 15 is indicated as being disposed intermediate the two sensing means in the drawing. These sensing means are of a nature so as to sense pressure as determined by whether or not they are uncovered or covered by the liquid in the tank. These sensing means may be vertically spaced any desired distance in accordance with the upper and lower limits of the liquid level as desired within the container. In the present illustration, the arrangement is such that as soon as the liquid covers the upper sensing means 24, the control system causes the liquid level to be lowered, and as soon as the liquid level uncovers the lower sensing means 20, the control system causes the liquid level to be raised as will hereinafter be fully explained.

Referring now to FIG. 1 which illustrates schematically the control system of the present invention, the elements 20, 22, 24 and 26 are illustrated. A pair of proportional amplifier fluidic devices are indicated generally by reference numerals 30 and 32. These fluidic devices are of well-known conventional construction. Fluidic device 30 includes a power stream input channel means 34, a first control signal input channel means 36, a second control signal input channel means 38, a first output channel means 40 and a second output channel means 42. In a similar manner, fluidic device 32 includes a power stream input channel means 50, a first control signal input channel means 52, a second control signal input channel means 54, a first output channel means 56 and a second output channel means 58.

A suitable source of fluid under pressure such as air or steam is provided for operating the control system. As illustrated, a plurality of sources of fluid under pressure are illustrated, although it will be understood that a common source of fluid under pressure may be connected with the various components illustrated as having connections with separate sources of fluid under pressure.

A first source of fluid under pressure 60 is connected by means of conduit 62 with the power stream input channel means 34 of the fluidic device 30. Another source of fluid under pressure 64 is connected by conduit 66 with the power stream input channel means 50 of fluidic device 32.

The control signal input channel means 38 and 52 of fluidic devices 30 and 32 respectively are interconnected by a conduit 68. A further source of fluid under pressure 70 is connected by conduit 72 through a manually operable needle valve 74 with an intermediate portion of conduit 68. A further source of fluid under pressure 80 is connected through a conduit 82 having a manually operable needle valve 84 therein with the control signal input channel means 54 of fluidic device 32. It should be noted that the lower sensing means 20 is connected by means of conduit 22 with conduit 82.

The output channel means 40 of fluidic device 30 is connected through a conduit 86 with the conduit 26 which also serves to connect the upper sensing means 24 with the control signal input channel means 36 of fluidic device 30. A manually operable needle valve 88 is connected in conduit 86.

A further fluidic device indicated generally by reference numeral 90 comprises a bistable fluidic device of well-known construction. This type of arrangement is also referred to as a flip-flop fluidic device. Fluidic device 90 includes a power stream input channel means 92, a first control signal input channel means 94, a second control signal input channel means 96, a first output channel means 98 and a second output channel means 100.

A further source of fluid under pressure 102 is connected by conduit 104 with the power stream input channel means 92 of fluidic device 90.

The first output channel means 56 of fluidic device 32 is vented through a conduit 110. The second output channel means 58 of this fluidic device is connected by a conduit 112 with the second control signal input channel means 96 of fluidic device 90. The output channel means 42 of fluidic device 30 is connected by conduit 114 with the first control signal input channel means 94 of fluidic device 90.

The first output channel means 98 of fluidic device 90 is vented through a conduit 116. The second output channel means 100 of fluidic device 90 is connected by a conduit 118 with a liquid level control mechanism 120. In the present case, it is assumed that liquid level control mechanism 120 comprises a pump which is driven when fluid under pressure flows through conduit 118 so as to pump liquid out of tank 10 to lower the level of the liquid in the tank. The pump may be driven directly by the fluid pressure flowing through conduit 118 or this fluid pressure may be employed to operate suitable switch means which controls the operation of the pump.

In the operation of the system, valve 74 is adjusted so that the pressure in channel means 38 is larger than the pressure in channel means 36. Valve 84 is adjusted so that the pressure in channel means 54 is greater than the pressure in channel means 52. With this arrangement, the fluid flowing through fluidic device 30 will be diverted into the output channel means 40, and the fluid flowing through fluidic device 32 will be diverted into output channel means 56. Fluid flowing through the bistable fluidic device 90 will flow through output channel means 98 and be vented, whereby no fluid pressure exists in conduit 118, and the pump 120 is not operated.

With the pump not in operation, it is assumed that the liquid level in the tank is rising. Valve 88 is adjusted so that when sensing means 24 is covered, the pressure in channel means 36 will be greater than the pressure in channel means 38. Accordingly, when the liquid rises to the point that sensing means 24 is covered, the pressure in channel means 36 becomes greater than the pressure in channel means 38, and the fluid flowing through fluidic device 30 is diverted into output channel means 42.

As the fluid flowing through fluidic device 30 is diverted into output channel means 42, it passes through conduit 114 to the control signal input channel means 94 of fluidic device 90 thereby diverting the fluid flowing through this latter fluidic device into the output channel means 100 whereupon the pump is activated and the liquid is pumped out of the tank to lower the liquid level in the tank.

As the upper sensing means 24 is uncovered, the pressure in channel means 38 of fluidic device 30 is again becomes greater than the pressure in channel means 36 whereby the fluid flowing through this fluidic device is again diverted into output channel means 40. However, the fluid flowing through device fluidic device 90 will continue to flow through the output channel means 100 since fluidic device 90 is a bistable fluidic device and there is no input signal pressure in either of channels 94 and 96.

When the liquid level drops to the point that it uncovers sensing means 20, the pressure in channel means 52 of fluidic device 32 becomes greater than the pressure in the channel means 54, and the fluid flowing through this fluidic device is diverted into the output channel means 58 and thence through conduit 112 to the control signal input channel means 96 of fluidic device 90. This causes the fluid flowing through fluidic device 90 to again be diverted into the output channel means 98, and the pump ceases to function. As the pump ceases to function, the liquid level will again begin to rise within the tank, and the entire cycle may be continuously repeated so as to automatically retain the level of the liquid in the tank between certain upper and lower desired limits.

Figure 3:
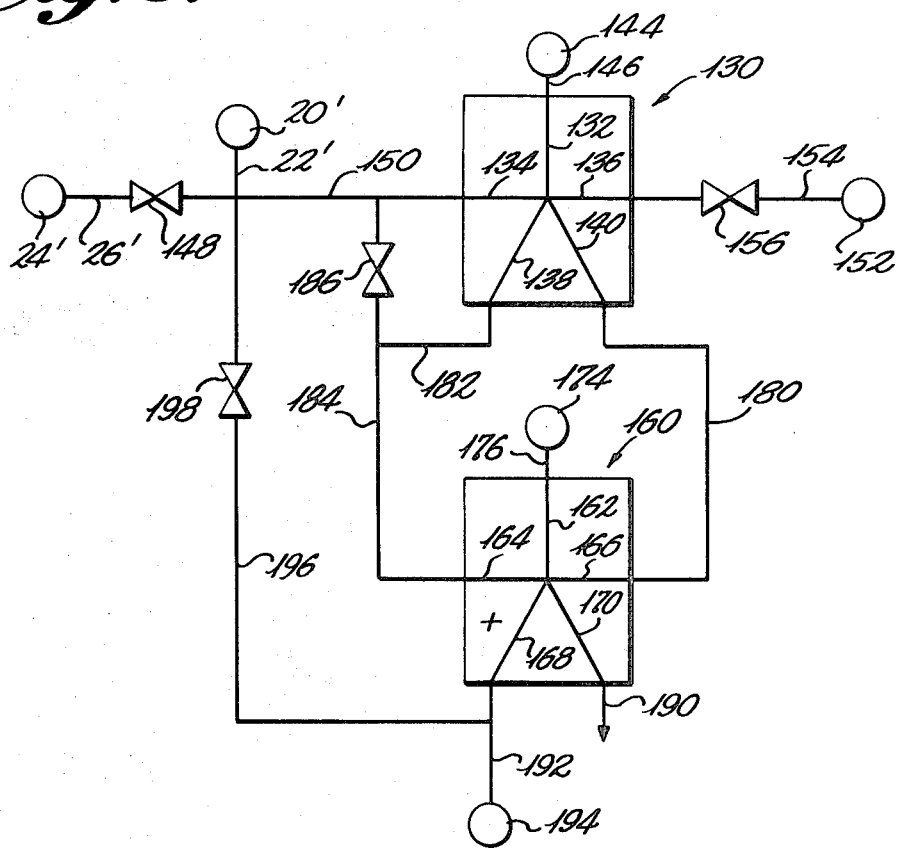
FIG. 3 is a schematic diagram of a modified form of control system according to the present invention.
Figure 4:
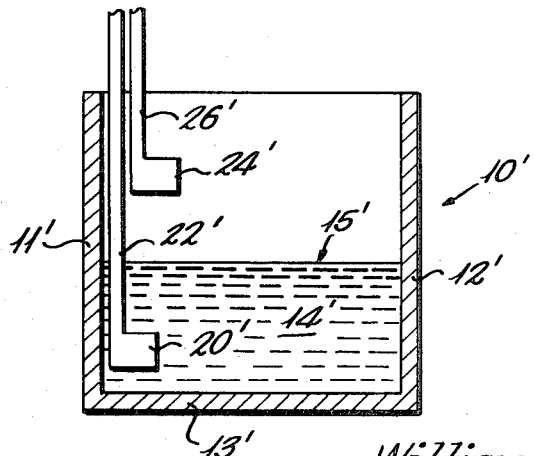
FIG. 4 is a cross section through a container having liquid therein and showing the sensing means mounted in position therewithin.

Referring now to FIGS. 3 and 4 of the drawings, a modified form of the invention is illustrated. The tank construction along with the sensing means and the associated conduits of this form of the invention are identical with that previously described, and these components have been given the same reference numerals primed, as seen in FIG. 4 of the drawings.

Referring now to FIG. 3 of the drawings, the control system is illustrated schematically, and the elements 20', 22', 24' and 26' of FIG. 4 are indicated in FIG. 3.

A proportional amplifier fluidic device is indicated generally by reference numeral 130. This fluidic device includes a power stream input channel means 132, a first control signal input channel means 134, a second control signal input channel means 136, a first output channel means 138 and a second output channel means 140.

In this form of the invention, a plurality of sources of fluid under pressure are so also illustrated, it being understood that a single source of fluid under pressure may be employed and connected with the corresponding components. A first source of fluid under pressure 144 is connected by conduit 146 with the power stream input channel means 132 of fluidic device 130.

The upper sensing means 24' is connected to conduit 26' and a manually operable needle valve 148 with a conduit 150 which provides a connection with the control signal input channel means 134 of fluidic device 130. The lower sensing means 20' is also connected by means of conduit 22' with conduit 150.

A source of fluid under pressure 152 is connected through a conduit 154 with the control signal input channel means 136 of fluidic device 130. A manually operable needle valve 156 is connected in conduit 154.

A bistable fluidic device 160 of conventional construction includes a power stream input channel means 162, a first control signal input channel means 164, a second control signal input channel means 166, a first output channel means 168 and a second output channel means 170. A source of fluid under pressure 174 is connected by conduit 176 with power stream input channel means 162 of fluidic device 160.

The second output channel means 140 of fluidic device 130 is cone connected by conduit 180 with the control signal input channel means 166 of fluidic device 160.

The first output channel means 138 of fluidic device 130 is connected by conduit 182 with a conduit 184 which is in turn connected with the control signal input channel means 164 of fluidic device 160. Conduit 184 also is connected with conduit 150 and has a manually operable needle valve 186 connected therein.

The second output channel means 170 of fluidic device 160 is vented through conduit 190. The first output channel means 168 of fluidic device 160 is connected by conduit 192 with a liquid level control mechanism 194 such as by a pump similar to the pump 120 previously described.

Conduit 192 is also connected with a conduit 196 which in turn is connected with the conduit 150 previously described. Conduit 196 has a manually operable needle valve 198 connected therein.

The valves 186 and 156 are adjusted so that the pressure in channel means 136 of fluidic device 130 is greater than the pressure in channel means 134 when the liquid level 15' in the tank 10' is disposed vertically between the sensing means 20' and 24', and the level of the liquid is rising.

When the pressure in channel means 136 is greater than the pressure in channel means 134, the fluid flowing through fluidic device 130 is diverted into output channel means 138 and thence through conduits 182 and 184 into the control signal channel means 164 of fluidic device 160 so that the fluid flowing through this latter fluidic device is diverted into the output channel means 170 and is vented. In this condition of operation, the pump 194 is not actuated, and the level of the liquid will continue to rise.

When the level of liquid covers sensing means 24', the pressure in control signal channel means 134 of fluidic device 130 becomes greater than the pressure in channel means 136, and the fluid flowing through this fluidic device is diverted into the output channel means 140 and thence through conduit 180 into the control signal input channel means 166 of fluidic device 160 whereby the fluid flowing through this latter fluidic device will be diverted into the output channel means 168 and thence through conduit 192 to the pump 194 so as to actuate the pump and to cause the liquid level in the tank to drop.

As the liquid level drops below sensing device 24', the fluidic device 130 will continue to have the fluid flowing therethrough diverted into the output channel means 140 since valve 198 enables fluid to flow from the conduit 192 and through conduit 196 and thence through conduit 150 into channel means 134 of fluidic device 130 to maintain the pressure in channel means 134 greater than the pressure in channel means 136.

When the liquid level uncovers the lower sensing means 20', the pressure in control signal input channel means 136 of fluidic device 130 becomes greater than the pressure in channel means 134 and the fluid flowing through fluidic device 130 is thereby diverted into the output channel means 138 and thence through conduits 182 and 184 to the control signal input channel means 164 of fluidic device 160 to divert the fluid flowing through this latter fluidic device into the output channel means 170 to be vented. Accordingly, the pump is no longer operated, and the liquid level in the tank will begin to rise. This entire cycle can then be automatically repeated for maintaining the level of the liquid in the tank between the desired upper and lower limits.

It is apparent from the foregoing that there is provided according to the present invention a new and novel liquid level control system employing fluidic devices which is automatic in operation and which maintains the liquid level in a tank between certain desired upper and lower limits. The control system is quite simple, inexpensive and compact in construction, and yet at the same time is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A liquid level control system for a tank containing liquid comprising liquid level sensing means including a pair of spaced sensing means to be positioned in said tank, first fluidic means operatively connected with said sensing means, said first fluidic means including output means, second fluidic means, said second fluidic means being operatively connected with said first fluidic means, said second fluidic means including an output, and a liquid level control mechanism operatively connected to the output of said second fluidic means, a source of fluid under pressure operatively connected with each of said fluidic means, and first fluidic means comprising first and second proportional amplifier fluidic devices each of which includes a power stream input channel means, first and second control signal input channel means and first and second output channel means, said second fluidic means comprising a bistable fluidic device including power stream input channel means and first and second output channel means, said source of fluid under pressure comprising means for providing fluid under pressure to the power stream input channel means of each of said fluidic devices, one of said spaced sensing means being operatively connected with the first control signal input channel means of said first fluidic device, another of said liquid level sensing means being operatively connected with the second control signal input channel means of said second fluidic device, the second output channel means of said first fluidic device being connected with the first control signal input channel means of said bistable fluidic device, the second output channel means of said second fluidic device being connected with the second control signal input channel means of said bistable fluidic device and valve means for controlling the first fluidic means such that when the liquid level in the tank is intermediate said spaced sensing means the pressure in said second control signal input channel means of said first fluidic device will be greater than the pressure in said first control signal input channel means of said first fluidic device, and the pressure in the second control signal input channel means of said second fluidic device will be greater than the pressure in the first control signal input channel means of said second fluidic device.

2. Apparatus as defined in claim 1 wherein the first output channel means of said bistable fluidic device is vented, the second output channel means of said fluidic device being connected with said liquid level control mechanism.

3. Apparatus as defined in claim 1 wherein the second control signal input channel means of said first fluidic device is operatively connected with the first control signal input channel means of said second fluidic device, and said valve means including valve means for controlling the fluid pressure in said last-mentioned two control signal input channel means.

4. Apparatus as defined in claim 1, wherein said first output channel means of said first fluidic device is interconnected with said first control signal input channel means of said first fluidic device said valve means including valve means in said interconnection.

5. Apparatus as defined in claim 1 wherein said first output channel means of said second fluid device is vented.

6. A liquid level control system for a tank containing liquid comprising liquid level sensing means including a pair of spaced sensing means to be positioned in said tank, first fluidic means operatively connected with said sensing means, said first fluidic means including output means, second fluidic means, said second fluidic means being operatively connected with the output of said first fluidic means, said second fluidic means including an output and a liquid level control mechanism operatively connected to the output of said second fluidic means, and a source of fluid under pressure operatively connected with each of said fluidic means, said first fluidic means comprising a proportional amplifier fluidic device including power stream input channel means, first and second control signal input channel means and first and second output channel means, said second fluidic means comprising a bistable fluidic device including power stream input channel means, first and second control signal input channel means and first and second output channel means, said source of fluid under pressure including means for supplying fluid under pressure to the power stream input channel means of said proportional amplifier fluidic device and said bistable fluidic devices, said first control signal input channel means of the proportional amplifier fluidic device being operatively connected with said pair of spaced sensing means, the second output channel means of said proportional amplifier fluidic device being operatively connected with the second control signal input channel means of said bistable fluidic device, the first output channel means of said proportional amplifier fluidic device being operatively connected with the first control signal input channel means of said bistable fluidic device, said first output channel means of said bistable fluidic device being connected with said liquid level control mechanism, said second output channel means of said bistable fluidic device being vented.

7. Apparatus as defined in claim 6 wherein said first output channel means of said proportional amplifier fluidic device is also connected through valve means with said first control signal input channel means of said proportional amplifier fluidic device.

8. Apparatus as defined in claim 6 wherein one of said liquid level sensing means is connected through valve means with said first control signal input channel means of said proportional amplifier fluidic device, and additional valve means for controlling the fluid pressure in said second control signal input channel means of the proportional amplifier fluidic device.

9. Apparatus as defined in claim 6 wherein said first output channel means of said bistable fluidic device is also connected with said first control signal input channel means of said proportional amplifier fluidic device.

10. Apparatus as defined in claim 9 including valve means operatively connected in the connection between the first output channel means of said bistable fluidic device and the first control signal input channel means of the proportional amplifier fluidic device.

11. A liquid level control system for a tank containing liquid comprising liquid level sensing means including a pair of spaced sensing means to be positioned in said tank, first fluidic means including at least one proportional amplifier fluidic device operatively connected with said sensing means and including a power stream input channel means, first and second control input channel means and first and second output channel means, all of said channel means being interconnected with one another in said one proportional amplifier fluidic device, second fluidic means comprising a bistable fluidic device including power stream input channel means, first and second control signal input channel means and first and second output channel means, one of said last mentioned output channel means being connected with a liquid level control mechanism, a source of fluid under pressure operatively connected with each of said fluidic means, one of said output channel means of said first fluidic means being operatively connected with one of the control signal input channel means of said bistable fluidic device, and selectively operable valve means for controlling the pressure in both the first and second control signal input channel means of said first fluidic means to produce a higher pressure in one of said control signal input channel means than in the other of the control signal input channel means of said first fluidic means.